(12) United States Patent
Al-Akhdar et al.

(10) Patent No.: US 6,486,226 B2
(45) Date of Patent: Nov. 26, 2002

(54) PHOSPHINE OXIDE PHOTOINITIATOR SYSTEMS AND CURABLE COMPOSITIONS WITH LOW COLOR

(75) Inventors: Walid Al-Akhdar, Danbury, CT (US); David Bramer, Putnam Valley, NY (US); Eugene Valentine Sitzmann, Jr., Hartsdale, NY (US); Donald A. Wostratzky, West Chicago, IL (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 51 days.

(21) Appl. No.: 09/730,227

(22) Filed: Dec. 5, 2000

(65) Prior Publication Data

US 2002/0107298 A1 Aug. 8, 2002

Related U.S. Application Data

(60) Provisional application No. 60/169,576, filed on Dec. 8, 1999.

(51) Int. Cl.$^7$ .............................. G03F 7/028; C08F 2/50; C08J 3/28; C08K 3/20
(52) U.S. Cl. .............................. 522/18; 522/64; 522/81; 522/83; 522/84; 522/92; 522/93; 522/96; 522/107; 523/300; 430/2; 430/281.1; 430/286.1
(58) Field of Search .............................. 522/64, 81, 83, 522/84, 18, 92, 93, 96, 107; 523/300; 430/2, 281.1, 286.1

(56) References Cited

U.S. PATENT DOCUMENTS

| 4,298,738 A | 11/1981 | Lechtken et al. ............. 546/22 |
| 4,737,593 A | 4/1988 | Ellrich et al. ................. 568/15 |
| 4,792,632 A | 12/1988 | Ellrich et al. ................. 568/15 |
| 5,218,009 A | 6/1993 | Rutsch et al. ................. 522/16 |
| 5,399,770 A | 3/1995 | Leppard et al. ............... 568/15 |
| 5,534,559 A | 7/1996 | Leppard et al. ............... 522/64 |
| 5,667,856 A | 9/1997 | Kamen et al. ............. 428/34.6 |
| 5,723,512 A | 3/1998 | Leppard et al. ............... 522/55 |
| 5,942,290 A | 8/1999 | Leppard et al. ............. 427/510 |
| 5,965,776 A | 10/1999 | Leppard et al. ............... 568/15 |
| 6,020,528 A | 2/2000 | Leppard et al. ............... 568/15 |

FOREIGN PATENT DOCUMENTS

| DE | 19907957 | 9/1999 |
| EP | 0741333 | 11/1996 |
| EP | 0893737 | 1/1999 |
| WO | 97/35232 | 9/1997 |

*Primary Examiner*—Susan Berman
(74) *Attorney, Agent, or Firm*—Tyler A. Stevenson

(57) ABSTRACT

The present invention relates to a novel photoinitiator system comprising one or more acylphosphine oxide photoinitiators and one or more lightfast red, blue or violet organic pigments. Low yellow color formation results upon curing ethylenically unsaturated compounds with the new photoinitiator system. Particular applications include clear and white coatings, screen inks, gel coats, powder coatings, composites, adhesives and lenses.

27 Claims, No Drawings

PHOSPHINE OXIDE PHOTOINITIATOR SYSTEMS AND CURABLE COMPOSITIONS WITH LOW COLOR

This application claims the benefit under 35 USC 119(e) of U.S. Provisional Application Serial No.60/169,576, filed on Dec. 8, 1999.

The present invention relates to a novel process for curing ethylenically unsaturated polymerizable compounds with acylphosphine oxide photoinitiators concomitantly with low color formation, to novel acylphosphine oxide photoinitiator compositions, and to the method of use of compositions which are curable with the novel photoinitiator composition.

Mono-, bis- and trisacylphosphine oxide compounds are well known photoinitiators. U.S. Pat. Nos. 4,792,632, 4,737,593 and 5,534,559 and GB-A-2310855 disclose bisacylphosphine oxide photoinitiators. Mono- and bisacylphosphine oxide photoinitiators are disclosed in U.S. Pat. No. 5,218,009. U.S. Pat. No. 5,942,290 discloses molecular complexes of mono-, bis- and trisacylphosphine oxides with α-hydroxyketone compounds as photoinitiators. Alkylbisacylphosphine oxides are disclosed in GB-A-2259704. Alkoxyphenyl-substituted bisacylphosphine oxide photoinitiators are described in GB-A-2292740. Dimeric bisacylphosphine oxide photoinitiators are revealed in U.S. Pat. No. 5,723,512.

U.S. Pat. No. 5,667,856 teaches ultraviolet radiation curable compositions comprising a curable component and a pigment selected from the group consisting of pyrrolopyrrol and isoindolinone, red and yellow pigments respectively. Ketone based and onium salt photoinitiators may be present.

Acylphosphine oxide compounds are very effective photoinitiators for ethylenically unsaturated compounds. However, a disadvantage of the use of photoinitiators of this class is that they are to varying degrees inherently yellow. Not all of the photoinitiator is consumed upon curing and therefore the cured substrate often has an undesired yellow color. This is considered "yellowing upon curing" or "initial yellowing." This is a particular problem for the curing of clear and white pigmented systems, for instance clear and white pigmented coatings on wood, metal, plastic, glass, etc., especially thick coatings. A solution to this problem would be beneficial for instance for gel coat and powder coating applications. Yellowing upon curing with acylphosphine oxides is also a particular problem in printing inks of all types including screen print, flexographic, gravure and off-set printing inks. This yellowing is also a problem for the curing of plastic lenses and lens coatings.

The undesired yellow color is a particular problem when photoinitiators of the class of bisacylphosphine oxides are employed. Currently, many practitioners, in certain applications, intentionally "over-irradiate" the curable substrate in order to purposely photo-bleach away any residual yellow color. This process is destructive to the formed article and is not economical. Surprisingly, it has now been found that photocuring a composition with an acylphosphine oxide photoinitiator in the presence of certain red, blue and violet pigments at low levels prevents the undesired yellow color of the cured substrate.

Accordingly, the invention relates to a process for curing ethylenically unsaturated polymerizable compounds, wherein minimal yellowing occurs upon curing, which comprises adding to said compounds
(a) at least one acylphosphine oxide photoinitiator, and
(b) one or more lightfast red, blue or violet organic pigments
wherein the weight ratio of component (b) to component (a) is from about 10 parts per million to about 10,000 parts per million,
and irradiating the mixture so obtained with ultraviolet radiation or daylight or with light sources equivalent to daylight.

The acylphosphine oxide photoinitiators of component (a) may be formulated together with the pigment or pigments of component (b) to form a novel acylphosphine oxide photoinitiator system that does not result in yellow color formation when employed in a curing process of ethylenically unsaturated polymerizable compounds. Accordingly, it is also an object of this invention to provide a photoinitiator system comprising
(a) at least one acylphosphine oxide photoinitiator, and
(b) one or more lightfast red, blue or violet organic pigments
wherein the weight ratio of component (b) to component (a) is from about 10 parts per million to about 10,000 parts per million.

The invention also relates to compositions which have minimal yellow color upon curing with ultraviolet radiation or daylight or with light sources equivalent to daylight comprising
at least one ethylenically unsaturated polymerizable compound, and
(a) at least one acylphosphine oxide photoinitiator, and
(b) one or more lightfast red, blue or violet organic pigments
wherein the weight ratio of component (b) to component (a) is from about 10 parts per million to about 10,000 parts per million.

The processes and compositions according to this invention comprise any acylphosphine oxide photoinitiator that is inherently yellow in color. Descriptions of mono-, bis- and trisacylphosphine oxide photoinitiators and which may be employed according to the present invention are found in U.S. Pat. No. 5,942,290, incorporated herein by reference.

Preferably, the acylphosphine oxide photoinitiators of component (a) are of formula (I)

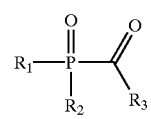

(I)

in which $R_1$ and $R_2$ independently of one another are $C_1$–$C_{12}$ alkyl, benzyl, phenyl which is unsubstituted or substituted from one to four times by halogen, $C_1$–$C_8$ alkyl and/or $C_1$–$C_8$ alkoxy, or are cyclohexyl or a group $COR_3$; or $R_1$ is —$OR_4$, or a group

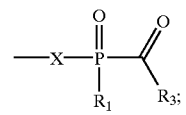

$R_3$ is phenyl which is unsubstituted or substituted from one to four times by $C_1$–$C_8$ alkyl, $C_1$–$C_8$ alkoxy, $C_1$–$C_8$ alkylthio and/or halogen, or is a group

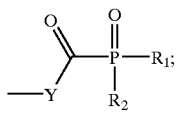

$R_4$ is $C_1$–$C_8$ alkyl, phenyl or benzyl;
Y is phenylene, $C_1$–$C_{12}$ alkylene or cyclohexylene; and
X is $C_1$–$C_{18}$ alkylene or a group

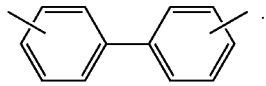

Most preferably, component (a) is at least one bisacylphosphine oxide class of formula (Ia)

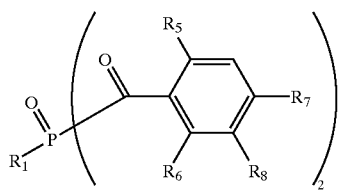

wherein
$R_1$ is $C_1$–$C_{12}$ alkyl, cyclohexyl or phenyl which is unsubstituted or substituted from one to four times by halogen and/or $C_1$–$C_8$ alkyl,
$R_5$ and $R_6$ are each independently of the other $C_1$–$C_8$ alkyl,
$R_7$ is hydrogen or $C_1$–$C_8$ alkyl, and
$R_8$ is hydrogen or methyl, preferably $R_8$ is hydrogen.

A preferred process is one wherein $R_1$ in the compounds of formula (Ia) is $C_2$–$C_{10}$ alkyl, cyclohexyl or phenyl which is unsubstituted or substituted one to four times by $C_1$–$C_4$ alkyl, Cl and/or Br.

An interesting process is also that wherein $R_1$ in the compounds of formula (Ia) is $C_3$–$C_8$ alkyl, cyclohexyl or phenyl which is unsubstituted or substituted in the 2-, 3-, 4- or 2,5-positions by $C_1$–$C_4$ alkyl.

A particularly preferred process is that wherein $R_1$ in the compounds of formula (Ia) is $C_4$–$C_{12}$ alkyl or cyclohexyl, $R_5$ and $R_6$ are each independently of the other $C_1$–$C_8$ alkyl and $R_7$ is hydrogen or $C_1$–$C_8$ alkyl.

A preferred process is that wherein $R_5$ and $R_6$ in the compounds of formula (Ia) are $C_1$–$C_4$ alkyl and $R_7$ is hydrogen or $C_1$–$C_4$ alkyl.

A particularly preferred process is that wherein $R_5$ and $R_6$ in the compounds of formula (Ia) are methyl and $R_7$ is hydrogen or methyl.

A further interesting process is that wherein $R_5$, $R_6$ and $R_7$ in the compounds of formula (Ia) are methyl.

A further preferred process is that wherein $R_5$, $R_6$ and $R_7$ in the compounds of formula (Ia) are methyl and $R_8$ is hydrogen.

A process meriting special mention is that wherein $R_1$ in the compounds of formula (Ia) is $C_3$–$C_8$ alkyl.

A particularly preferred process is that wherein $R_1$ in the compounds of formula (Ia) is isobutyl.

A very particularly preferred process is that wherein $R_1$ in the compounds of formula (Ia) is phenyl.

A most preferred process is that wherein the compound of formula (Ia) is Irgacure® 819, available from Ciba Specialty Chemicals:

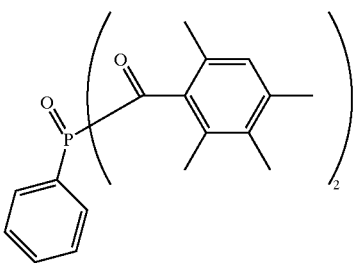

$C_1$–$C_{12}$ alkyl can be linear or branched and is, for example, methyl, ethyl, propyl, isopropyl, butyl, isobutyl, sec-butyl, tert-butyl, pentyl, isopentyl, hexyl, heptyl, octyl, nonyl, decyl or dodecyl. Preference is given to $C_1$–$C_{12}$, for example $C_1$–$C_8$ or $C_1$–$C_6$, especially $C_1$–$C_4$ alkyl, which have the same definitions as indicated above up to the appropriate number of C atoms.

$C_1$–$C_8$ alkoxy can be linear or branched and is, for example, methoxy, ethoxy, propoxy, isopropoxy, butoxy, isobutoxy, sec-butoxy, tert-butoxy, pentoxy, isopentoxy, hexyloxy, heptyloxy or octyloxy. Preference is given, for example, to $C_1$–$C_6$ or, in particular, $C_1$–$C_4$ alkoxy, which have the same definitions as indicated above up to the appropriate number of C atoms.

$C_1$–$C_8$ alkylthio can be linear or branched and is, for example, methylthio, ethylthio, propylthio, isopropylthio, butylthio, tert-butylthio, hexylthio or octylthio, especially methylthio.

Halogen is, for example, chlorine, bromine and iodine, especially chlorine.

Substituted phenyl is substituted from one to four times, for example once, twice or three times. Substitution takes place, for example, in positions 2, 3, 4, 5, 2,4, 2,5, 2,6, 3,4, 3,5, 2,4,6 or 3,4,5 of the phenyl ring. $C_1$–$C_8$ alkyl, $C_1$–$C_4$ alkyl, $C_1$–$C_8$ alkoxy, $C_1$–$C_8$ alkylthio and $C_1$–$C_4$ alkoxy substituents can have the definitions indicated above. Examples of substituted phenyl are tolyl, xylyl, 4-methoxyphenyl, 2,4- and 2,5-dimethoxyphenyl, ethylphenyl, 2,4,6-trimethylphenyl and 4-alkoxy-2-methylphenyl.

Preferably, the weight ratio of component (b) to component (a) in the processes and compositions of this invention is from about 100 parts per million to about 1000 parts per million. The weight ratio of component (b) to component (a) employed is dependent, among other things, on the photoinitiator or photoinitiators of component (a), the pigment of component (b) and the curable substrate.

The red, blue or violet pigments of component (b) are selected from lightfast organic pigments. Preferred are organic pigments of the quinacridone, carbazole dioxazine and perylene red classes.

Color is commonly quantified by the tri-stimulus (L, a, b) color scale used in industry. Positive a values represent red and negative a values represent green. Positive b values represent yellow and negative b values represent blue. L values represent darkness and brightness. When L=100, a clear film is 100% transmitting and a white (TiO$_2$) pigmented film is 100% reflecting. In the formulations of the present invention, the pigments of component (b) do not decrease the L value by more than 2, preferably not more than 1. L values are also a function of pigment particle size, L will decrease with increasing pigment particle size. The pigment or pigments of component (b) have a positive a value and a negative b value when in a liquid dispersion.

Preferably, the pigment or pigments of component (b), when dispersed in a liquid at 5 parts per million by weight, have an a value of 15 to 25 and a b value of −15 to −30. The liquid referred to above is any appropriate solvent or medium for dispersing pigments in order to measure their color.

Industry also employs "YI" as a measure of yellowness. YI is a function of the tri-stimulus L, a, b values. The a and b values have more of an impact on YI than does the L value.

Preferably, the pigment particle size of component (b) is less than 50 microns. The pigments are lightfast, for example they remain stable up to 10 Joules/cm$^2$ of UV exposure in air. The pigments are also thermally stable and are inert in the radiation curable formulation. The pigments of component (b) do not interfere with the radiation cure performance of the curable substrate and they also do not effect the long-term properties of the cured substrate at the levels employed.

The pigments of component (b) are dispersible in the photoinitiator or photoinitiators of component (a). For example, the novel photoinitiator system of this invention comprising components (a) and (b) may be highly dispersed, free-flowing liquid or solid mixtures. Photoinitiators in addition to those of formulae (I) or (Ia) may be employed in the processes and compositions of this invention. Likewise, highly dispersed, free-flowing liquid or solid mixtures of components (a), (b) and additional photoinitiators may be obtained.

The pigments of component (b), at the levels employed, do not appreciably absorb light in the range which is used in the curing process. This range, discussed infra, is about 200 nm to about 600 nm. The pigments of component (b) therefore do not interfere with the light-induced cure process, for example they have no effect on the cure speed.

The ethylenically unsaturated polymerizable compounds can contain one or more than one olefinic double bond. They may be low molecular (monomeric) or high molecular (oligomeric) compounds.

Typical examples of monomers containing one double bond are alkyl or hydroxyalkyl acrylates or methacrylates, for example methyl, ethyl, butyl, 2-ethylhexyl and 2-hydroxyethyl acrylate, isobornyl acrylate, and methyl and ethyl methacrylate. Further examples of these monomers are acrylonitrile, acrylamide, methacrylamide, N-substituted (meth)acrylamides, vinyl esters such as vinyl acetate, vinyl ethers such as isobutyl vinyl ether, styrene, alkylstyrenes, halostyrenes, N-vinylpyrrolidone, vinyl chloride and vinylidene chloride.

Examples of monomers containing more than one double bond are ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, pentaerythritol divinyl ether, vinyl acrylate, divinyl benzene, divinyl succinate, diallyl phthalate, triallyl phosphate, triallyl isocyanurate or tris(2-acryloylethyl)isocyanurate. Examples of high molecular weight (oligomeric) polyunsaturated compounds are acrylated epoxy resins, acrylated polyethers, acrylated polyurethanes and acrylated polyesters. Further examples of unsaturated oligomers are unsaturated polyester resins, which are usually prepared from maleic acid, phthalic acid and one or more diols and which have molecular weights of greater than about 500. Unsaturated oligomers of this type are also known as prepolymers.

Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and polyurethanes and copolymers thereof, polybutadiene and butadiene copolymers, polyisoprene and isoprene copolymers, polymers and copolymers containing (meth)acrylic groups in side-chains, as well as mixtures of one or more than one such polymer.

Illustrative examples of unsaturated carboxylic acids are acrylic acid, methacrylic acid, crotonic acid, itaconic acid, cinnamic acid, unsaturated fatty acids such as linolenic acid or oleic acid. Acrylic and methacrylic acid are preferred.

Suitable polyols are aromatic and, preferably, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, preferably on the aromatic polyols and epichlorohydrin. Further suitable polyols are polymers and copolymers which contain hydroxyl groups in the polymer chain or in side groups, for example polyvinyl alcohol and copolymers thereof or hydroxyalkyl polymethacrylates or copolymers thereof. Other suitable polyols are oligoesters carrying hydroxyl end groups.

Illustrative examples of aliphatic and cycloaliphatic polyols are alkylenediols containing preferably 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be esterified partially or completely with one or with different unsaturated carboxylic acids, in which case the free hydroxyl groups of the partial esters may be modified, for example etherified, or esterified with other carboxylic acids.

Illustrative examples of esters are: Trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentacrylate, sorbitol hexacrylate, oligoester acrylates and methacrylates, glycerol di- and-triacrylate, 1,4-cyclohexanediacrylate, bisacrylates and bismethacrylates of polyethylene glycol having molecular weights of 200 to 1500, or mixtures thereof Polyfunctional monomers and oligomers are available for example from UCB Chemicals, Smyrna, Ga., and Sartomer, Exton, Pa.

Suitable ethylenically unsaturated polymerizable compounds are also the amides of identical or different unsaturated carboxylic acids of aromatic, cycloaliphatic and aliphatic polyamines containing preferably 2 to 6, more particularly 2 to 4, amino groups. Exemplary of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, bis(β-aminoethyl) ether, diethylenetriamine, triethylenetetramine, bis(β-aminoethoxy)ethane or bis(β-aminopropoxy)ethane. Other suitable polyamines are polymers and copolymers which may contain additional amino groups in the side-chain and oligoamides containing amino end groups.

Exemplary of such unsaturated amides are: Methylenebisacrylamide, 1,6-hexamethylenebisacrylamide, diethylenetriaminetrismethacrylamide, bis(methacrylamidopropoxy)ethane, β-methacrylamidoethylmethacrylate, N-[(β-hydroxyethoxy)ethyl]acrylamide.

Suitable unsaturated polyesters and polyamides are derived typically from maleic acid and diols or diamines. Maleic acid can be partially replaced by other dicarboxylic acids such as fumaric acid, itaconic acid, citraconic acid, mesaconic acid or chloromaleic acid. To control the reactivity of the polyester and to influence the crosslinking density and hence the product properties, it is possible to use in addition to the unsaturated dicarboxylic acids different amounts of saturated dicarboxylic acids such as phthalic acid, isophthalic acid, terephthalic acid, tetrahydrophthalic acid, succinic acid or adipic acid. The unsaturated polyesters can be used together with ethylenically unsaturated comonomers such as styrene. The polyesters and polyamides can also be derived from dicarboxylic acids and ethylenically unsaturated diols or diamines, especially from those with long chains containing typically from 6 to 20 carbon atoms. Polyurethanes are typically those derived from saturated or unsaturated diisocyanates and unsaturated and saturated diols.

Suitable polyester acrylates or acrylated polyesters are obtained by reacting oligomers, typically epoxides, urethanes, polyethers or polyesters, with acrylates such as hydroxyethyl acrylate or hydroxypropyl acrylate.

Polybutadiene and polyisoprene and copolymers thereof are known. Suitable comonomers include olefins such as ethylene, propene, butene, hexene, (meth)acrylates, acrylonitrile, styrene or vinyl chloride. Polymers containing (meth)acrylate groups in the side-chain are also known. They may typically be reaction products of epoxy resins based on novolak with (meth)acrylic acid, homo- or copolymers of polyvinyl alcohol or their hydroxyalkyl derivatives which are esterified with (meth)acrylic acid or homo- and copolymers of (meth)acrylates which are esterified with hydroxyalkyl(meth)acrylates.

Preferred monomers are typically alkyl- or hydroxyalkyl acrylates or methacrylates, styrene, ethylene glycol diacrylate, propylene glycol diacrylate, neopentyl glycol diacrylate, hexamethylene glycol diacrylate or bisphenol A diacrylate, 4,4'-bis(2-acryloyloxyethoxy)diphenylpropane, trimethylolpropane triacrylate, pentaerythritol triacrylate or tetraacrylate, preferably acrylates, styrene, hexamethylene glycol or bisphenol A diacrylate, 4,4'-bis(2-acryloyloxyethoxy)diphenylpropane or trimethylolpropane triacrylate.

Particularly preferred (oligomeric) polyunsaturated compounds are polyester acrylates or unsaturated polyester resins which are prepared from maleic acid, fumaric acid, phthalic acid and one or more than one diol, and which typically have molecular weights from about 500 to 3000.

Preferred unsaturated carboxylic acids are acrylic acid and methacrylic acid.

The photopolymerizable compounds are used by themselves or in any desired mixtures. It is preferred to use mixtures of polyol(meth)acrylates.

Binders may also be added to the unsaturated photopolymerizable compounds. The addition of binders is particularly useful if the photopolymerizable compounds are liquid or viscous substances. The amount of binder may be from 5–95, preferably 10–90 and, most preferably, 40–90, percent by weight, based on the entire composition. The choice of binder will depend on the field of use and the desired properties therefore, such as the ability of the compositions to be developed in aqueous and organic solvent systems, adhesion to substrates and susceptibility to oxygen.

Suitable binders are typically polymers having a molecular weight of about 5,000 to 2,000,000, preferably 10,000 to 1,000,000. Illustrative examples are: Homo- and copolymers of acrylates and methacrylates, including copolymers of methyl methacrylate/ethyl acrylate/methacrylic acid, poly(alkylmethacrylates), poly(alkylacrylates); cellulose esters and ethers such as cellulose acetate, cellulose acetobutyrate, methyl cellulose, ethyl cellulose; polyvinyl butyral, polyvinyl formal, cyclized rubber, polyethers such as polyethylene oxide, polypropylene oxide, polytetrahydrofuran; polystyrene, polycarbonate, polyurethane, chlorinated polyolefins, polyvinyl chloride, copolymers of vinyl chloride/vinylidene chloride, copolymers of vinylidene chloride with acrylonitrile, methyl methacrylate and vinyl acetate, polyvinyl acetate, copoly(ethylene/vinyl acetate), polymers such as polycaprolactam and poly(hexamethylene adipamide), polyesters such as poly(ethylene glycol terephthalate) and poly(hexamethylene glycol succinate).

The unsaturated compounds can also be used in admixture with non-photopolymerizable film-forming components. These components may be physically drying polymers or solutions thereof in organic solvents, for example nitrocellulose or cellulose acetobutyrate. The photopolymerizable unsaturated monomers may be a component of a free radical-ionic curable blend, such as a free radical-cationic curable blend. Also of importance are systems that undergo both thermal and photo-induced curing cycles, such as are used in powder coatings, laminates, certain adhesives and conformal coatings.

Mixtures of a prepolymer with polyunsaturated monomers which, additionally contain a further unsaturated monomer are frequently used in paint systems. The prepolymer in this instance primarily determines the properties of the paint film and, by varying it, the skilled person can influence the properties of the cured film. The polyunsaturated monomer acts as crosslinking agent that renders the paint film insoluble. The mono-unsaturated monomer acts as reactive diluent with the aid of which the viscosity is lowered without having to use a solvent. Moreover, properties of the cured composition such as curing rate, crosslinking density and surface properties are dependent on the choice of monomer.

Unsaturated polyester resins are usually used in two-component systems, together with a mono-unsaturated monomer, preferably with styrene.

Binary electron-rich/electron-poor monomer systems are often employed in thick pigmented coatings. For example, vinyl ether/unsaturated polyester systems are employed in powder coatings and styrene/unsaturated polyester systems are used in gel coats.

A preferred process is that wherein the ethylenically unsaturated polymerizable compounds are a mixture of (i) at least one oligomeric compound and (ii) at least one monomer.

An interesting process is that wherein the ethylenically unsaturated polymerizable compounds are a mixture of (i) unsaturated polyesters, especially those that are prepared from maleic acid, fumaric acid and/or phthalic acid and one or more than one diol, and which have molecular weights of 500 to 3,000, and (ii) acrylates, methacrylates or styrene or combinations thereof.

An important process is also that wherein the ethylenically unsaturated polymerizable compounds are a mixture of (i) unsaturated polyesters and (ii) acrylates or methacrylates or combinations thereof.

Another interesting process is that wherein the ethylenically unsaturated polymerizable compounds are a mixture of (i) unsaturated polyester acrylates and (ii) acrylates or methacrylates or combinations thereof.

In addition to the photoinitiator, the photopolymerizable compositions may contain different additives. Examples thereof are thermal inhibitors, which are intended to prevent premature polymerization, for example hydroquinone, hydroquinone derivatives, p-methoxyphenol, β-naphthol or sterically hindered phenols such as 2,6-di(tert-butyl)-p-cresol. To enhance the dark storage stability it is possible to add copper compounds, including copper naphthenate, copper stearate or copper octoate, phosphorus compounds, including triphenylphosphine, tributylphosphine, triethyl phosphite, triphenyl phosphite, or tribenzyl phosphite, quaternary ammonium compounds, such as tetramethylammonium chloride or trimethylbenzylammonium chloride, or hydroxylamine derivatives, such as N-diethylhydroxylamine. The exclusion of atmospheric oxygen during the polymerization may be effected by adding paraffin or similar wax-like substances which, at the onset of polymerization, migrate to the surface owing to lack of solubility in the polymer and form a transparent film which prevents air from entering the system. Similarly, an oxygen-impermeable layer may be applied. UV absorbers, typically those of the hydroxyphenylbenzotriazole, hydroxyphenylbenzophenone, oxanilide or hydroxyphenyl-s-triazine type, or combinations thereof, may be added as light stabilizers. It may be advantageous to add light stabilizers that do not absorb UV light, for example those of the sterically hindered amine (HALS) class. The light stabilizers selected from the classes of UV absorbers or HALS may be employed separately or in any combination.

Examples of such UV absorbers and light stabilizers are:

1. 2-(2-Hydroxyphenyl)benzotriazoles, for example 2-(2-hydroxy-5-methylphenyl)benzotriazole, 2-(3,5-di-tert-butyl-2-hydroxyphenyl)benzotriazole, 2-(5-tert-butyl-2-hydroxyphenyl)benzotriazole, 2-(2-hydroxy-5-(1,1,3,3-tetramethylbutyl)phenyl)benzotriazole, 2-(3,5-di-tert-butyl-2-hydroxyphenyl)-5-chloro-benzotriazole, 2-(3-tert-butyl-2-hydroxy-5-methylphenyl)-5-chloro-benzotriazole, 2-(3-sec-butyl-5-tert-butyl-2-hydroxyphenyl)benzotriazole, 2-(2-hydroxy-4-octyloxyphenyl)benzotriazole, 2-(3,5-di-tert-amyl-2-hydroxyphenyl)benzotriazole, 2-(3,5-bis-(α,α-dimethylbenzyl)-2-hydroxyphenyl)benzotriazole-2-(3-tert-butyl-2-hydroxy-5-2-octyloxycarbonylethyl)phenyl)-5-chloro-benzotriazole, 2-(3-tert-butyl-5-[2-(2-ethylhexyloxy)-carbonylethyl]-2-hydroxyphenyl)-5-chloro-benzyltriazole, 2-(3-tert-butyl-2-hydroxy-5-(2-methoxycarbonylethyl)phenyl)-5-chloro-benzotriazole, 2-(3-tert-butyl-2-hydroxy-5-(2-methoxycarbonylethyl) phenyl)benzotriazole, 2-(3-tert-butyl-2-hydroxy-5-(2-octyloxycarbonylethyl)phenyl)benzotriazole, 2-(3-tert-butyl-5-[2-2-ethylhexyloxy)carbonylethyl]-2-hydroxyphenyl)benzotriazole, 2-(3-dodecyl-2-hydroxy-5-methylphenyl)benzotriazole, 2-(3-tert-butyl-2-hydroxy-5-(2-isooctyloxycarbonylethyl)phenylbenzotriazole, 2,2'-methylene-bis[4-1,1,3,3-tetramethylbutyl-)6-benzotriazole-2-ylphenol]; the transesterification product of 2-[3-tert-butyl-5-(2-methoxycarbonylethyl)-2-hydroxyphenyl]-2H-benzotriazole with polyethylene glycol 300; [R—CH$_2$CH$_2$—COO—CH$_2$CH$_2$—]$_2$ where R=3'-tert-butyl-4'-hydroxy-5'-2H-benzotriazol-2-ylphenyl, 2-[2-hydroxy-3-(α,α-dimethylbenzyl)-5-(1,1,3,3-tetramethylbutyl)-phenyl]benzotriazole; 2-[2-hydroxy-3-(1,1,3,3-tetramethylbutyl)-5-(α,α-dimethylbenzyl)-phenyl]benzotriazole.

2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β, β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

5. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane-tetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2, 4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2hydroxy-4-propyloxyphenyl)-6-(2,4-dimethylphenyl)-1,3,5-triazine, 2-(2-hydroxy-4octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3(2-ethylhexyl-1-oxy)-2-hydroxypropyloxy]phenyl}-4,6-bis(2,4-dimethylphenyl)-1,3,5-triazine, 4,6-bis(2,4-dimethylphenyl)2-[2-hydroxy-4-(2-hydroxy-3-nonyloxypropoxy)-5-(1-methyl-1-phenylethyl)phenyl]-1,3,5-triazine.

8. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,fl][1,3,2]dioxaphosphepin, 6-fluoro-2,4,8,10-tetra-tert-butyl-12-methyl-dibenzo[d,g][1,3,2]dioxaphosphepin, 6-bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2ethylhexyl(3,3',5,5'-tetra-tert-butyl-1,1'-biphenyl-2,2'-diyl)phosphite.

Additionally, there may be employed in the processes and compositions of this invention additives selected from the classes of fillers, flow aids, adhesion promoters, rheological modifiers such as fumed silica, pigments, dyes, optical brighteners, wetting agents and surfactants, among others.

The invention therefore also provides a process for curing ethylenically unsaturated polymerizable compounds which comprises adding to said compounds, in addition to components (a) and (b), one or more light stabilizers selected from the group consisting of hydroxyphenylbenzotriazoles, hydroxyphenyl-s-triazines and hindered amines based on 2,2,6,6-tetramethylpiperidine.

The photopolymerization can be accelerated by adding amines such as triethanolamine, N-methyl-diethanolamine, ethyl p-dimethylaminobenzoate or Michler's ketone. The action of the amines can be intensified by the addition of aromatic ketones of the benzophenone type. Amines useful as oxygen scavengers are typically the substituted N,N-dialkylanilines described in EP-A-339841.

The photopolymerization can further be accelerated by the addition of photosensitisers. These photosensitisers are preferably aromatic carbonyl compounds such as benzophenone derivatives, thioxanthone derivatives, anthraquinone derivatives and 3-acylcoumarin derivatives as well as 3-(aroylmethylene)thiazolines, and also eosine, rhodamine and erthrosine dyes. The compositions of this invention may also contain a photoreducible dye such as a xanthene, benzoxanthene, benzothioxanthene, thiazine, pyronine, porphyrine or acridin dye, and/or a trihalomethyl compound which is cleavable by irradiation. Similar compositions are disclosed, inter alia, in EP-A-445624.

The curing process of, in particular, for example with $TiO_2$, pigmented systems, can be supported by the addition of a component, which produces radicals under thermic conditions as, for example, an azo compound as 2,2'-azobis (4-methoxy-2,4-dimethylvaleronitril), a triazine, diazo sulfide, pentazadiene or a peroxy compound such as hydroperoxide or peroxycarbonate, for example t-butylhydroperoxide, as is disclosed, for example, in EP-A 245639.

Depending on the envisaged end use further customary additives are fluorescent whitening agents, fillers, pigments, dyes, wetting agents or flow control agents. Thick and pigmented coatings can suitably be cured by the addition of glass microbeads or powdered glass fibers, as described in U.S. Pat. No. 5,013,768, for example.

Accordingly, the invention also relates to a process comprising the use of a variety of additional additives.

The invention also relates to a process in which the ethylenically unsaturated polymerizable compounds are dissolved or emulsified in water.

Many varieties of such photocurable aqueous prepolymer dispersions are commercially available. Such dispersions will generally be understood as meaning dispersions comprising water and at least one prepolymer dispersed therein. The concentration of water in these systems is in the range from typically 5 to 80% by weight, preferably from 30 to 60% by weight. The dispersions contain the photocurable prepolymer or mixture thereof in a concentration of 95 to 20% by weight, preferably of 70 to 40% by weight. The sum of the indicated percentages of water and prepolymers in these compositions is always 100, to which are added the auxiliaries and additives in various amounts depending on the application.

The photocurable film-forming prepolymers which are dispersed, and often dissolved, in water are mono- or polyfunctional, ethylenically unsaturated prepolymers which can be initiated by free radicals and are known per se for use in aqueous prepolymer dispersions. They typically contain from 0.01 to 1.0 mol of polymerizable double bonds per 100 g of prepolymer and also have an average molecular weight of at least 400, preferably of 500 to 10,000. Depending on the envisaged end use, however, prepolymers of higher molecular weight are also suitable, including polyesters having an acid number of not more than 10 and containing polymerizable C—C double bonds, polyethers containing polymerizable C—C double bonds, hydroxyl group containing reaction products of a polyepoxide containing at least two epoxy groups per molecule with at least one α,β-ethylenically unsaturated carboxylic acid, polyurethane(meth)acrylates as well as the acrylic copolymers containing α,β-ethylenically unsaturated acrylic radicals described in EP-A-12339. It is also possible to use mixtures of these prepolymers. Also suitable are the polymerizable prepolymers disclosed in EP-A-33896 which are thioether polyadducts of polymerizable prepolymers having an average molecular weight of at least 600, a carboxyl group value of 0.2 to 15%, and containing 0.01 to 0.8 mol of polymerizable C—C double bonds per 100 g of prepolymer. Other suitable aqueous dispersions based on special alkyl (meth)acrylate polymers are disclosed in EP-A-41125. Suitable water-dispersible photocurable prepolymers of urethane acrylates are disclosed in DE-A-2936039.

As further additives these photocurable aqueous prepolymer dispersions may contain dispersants, emulsifiers, antioxidants, light stabilizers, dyes, pigments, fillers such as talcum, gypsum, silica, rutile, carbon black, zinc oxide and iron oxides, reaction accelerators, flow control agents, lubricants, wetting agents, thickeners, dulling agents, antifoams and other modifiers conventionally used in coating technology. Suitable dispersants are water-soluble high molecular weight organic compounds carrying polar groups, typically polyvinyl alcohols, polyvinyl pyrrolidone or cellulose ethers. Suitable emulsifiers may be nonionic emulsifiers and, in some cases, ionic emulsifiers may also be used.

Photocurable aqueous systems or emulsions may also be employed according to this invention. The aqueous system is applied to the substrate and then is force-dried to remove water and other volatiles such as amines, and is subsequently cured.

The photopolymerizable compositions contain the photoinitiator of component (a) conveniently in an amount of about 0.05 to about 15% by weight, preferably about 0.2 to about 5% by weight, based on the composition.

A process is therefore preferred in which the photoinitiator of component (a) is used in an amount of about 0.05 to about 15% by weight, preferably from about 0.2 to about 5% by weight.

In specific cases it may be advantageous, in addition to the photoinitiator of component (a), to use other known photoinitiators, for example benzophenone, benzophenone derivatives, acetophenone, acetophenone derivatives, such as α-hydroxycycloalkylphenylketones, α-hydroxyalkylphenylketones, 1-benzoyl-1-hydroxy-1-methylethane, dialkoxyacetophenones, α-hydroxy- or α-aminoacetophenones, e.g. 4-morpholinophenyl-2-benzyl-2-dimethylaminopropionyl, 4-aroyl-1,3-dioxolanes, benzoin alkyl ethers and benzil ketals, further acylphosphine oxides, diisopropylxanthogen disulfide, ferrocenes or titanocenes.

Accordingly, the invention also relates to a process comprising the use of other photoinitiators in addition to the photoinitiator or photoinitiators of formula (I).

The photoinitiator compositions of the instant invention are usefull for a variety of utilities, and in any utility in which the presence of a yellow color after curing cannot be tolerated.

The novel photoinitiator systems described herein, comprising (a) at least one acylphosphine oxide photoinitiator, and (b) one or more lightfast red, blue or violet organic pigments, are systems that when employed in a curing process of ethylenically unsaturated polymerizable compounds, reduce the yellowing upon curing associated with the use of acylphosphine oxide photoinitiators.

A specific novel photoinitiator system comprising components (a) and (b) in a certain ratio is effective at reducing yellowing upon curing independent of the application. For example, a specific system is effective independent of film thickness, color (various pigments), resins (polyurethanes, polyesters), etc.

The photopolymerizable compositions can be used for example as printing inks, as varnishes or clearcoats, as white paints, for example for wood or metal, as coating compositions, inter alia, for paper, wood, metal, glass or plastic, as gel coat or powder coating formulations, as daylight-curable coatings for buildings and roadmarking, for photographic reproduction processes, for holographic recording materials, for image recording processes or for the production of printing plates which can be developed using organic solvents or aqueous-alkaline media, for the production of masks for screen printing, as dental filling materials, as adhesives, as pressure-sensitive adhesives, as laminating resins, as etch resists or permanent resists and as solder masks for electronic circuits, for the production of three-dimensional articles by bulk curing (UV curing in transparent molds) or by the stereolithography process, as described, for example, in U.S. Pat. No. 4,575,330, for the preparation of composite materials (for example styrenic polyesters, which may contain glass fibers and other assistants) and other thick-layer compositions, for the coating or encapsulation of electronic components or as coatings for optical fibers.

The novel photoinitiator systems according to the invention may also be used as initiators for emulsion polymerizations, as initiators of a polymerization for the fixing of ordered states of liquid-crystalline mono- and oligomers, and as initiators for the fixing of dyes to organic materials.

In surface coatings, mixtures of a prepolymer with polyunsaturated monomers are often used which also contain a monounsaturated monomer. The prepolymer here is primarily responsible for the properties of the coating film, and variation thereof allows the person skilled in the art to influence the properties of the cured film. The polyunsaturated monomer functions as a crosslinking agent which renders the coating film insoluble. The monounsaturated monomer functions as a reactive diluent by means of which the viscosity is reduced without the need to use a solvent.

Unsaturated polyester resins are mostly used in two-component systems in conjunction with a monounsaturated monomer, preferably styrene.

As mentioned, the novel photoinitiator systems according to the invention can additionally be used as free-radical photoinitiators or photoinitiating systems for radiation-curable powder coatings. The powder coatings can be based on solid resins and on monomers containing reactive double bonds, for example maleates, vinyl ethers, acrylates, acrylamides and mixtures thereof. A free-radically UV-curable powder coating can be formulated by mixing unsaturated polyester resins with solid acrylamides (e.g. methyl methacrylamidoglycolate) and with a free-radical photoinitiator system according to the invention, as described, for example, in the paper "Radiation Curing of Powder Coating", Conference Proceedings, Radtech Europe 1993 by M. Wittig and Th. Gohmann. Similarly, free-radically UV-curable powder coatings can be formulated by mixing unsaturated polyester resins with solid acrylates, methacrylates or vinyl ethers and with a photoinitiator system according to the invention. The powder coatings may also comprise binders as described, for example, in DE-A-4228514 and EP-A-636669. The UV-curable powder coatings may also comprise white or colored pigments. Thus, for example, preferably rutile titanium dioxide can be employed in concentrations of up to 50% by weight in order to give a cured powder coating having good covering power. The process normally comprises electrostatic or tribostatic spraying of the powder onto the substrate, for example metal or wood, melting of the powder by heating and, after a smooth film has been formed, radiation-curing of the coating using ultraviolet and/or visible light, for example with medium-pressure mercury lamps, metal halide lamps or xenon lamps. A particular advantage of the radiation-curable powder coatings over their heat-curable counterparts is that the flow time after the melting of the powder particles can be selectively extended in order to ensure the formation of a smooth, high-gloss coating. In contrast to heat-curable systems, radiation-curable powder coatings can be formulated without the unwanted effect of a reduction in their lifetime, so that they melt at relatively low temperatures. For this reason, they are also suitable as coatings for heat-sensitive substrates such as wood or plastics. In addition to the photoinitiator systems according to the invention, the powder coating formulations may also include UV absorbers. Appropriate examples have been listed above under sections 1.–8.

Also as mentioned, the novel processes and compositions according to this invention may be employed for radiation curable gel coats. Gel coats are typically relatively thick and therefore are often not completely cured through the entire coating. The processes and compositions of this invention then are particularly important for gel coats because they will have un-photolyzed acylphosphine oxide photoinitiators which will impart an undesired yellow color to the surface. The photocurable compositions according to the invention are suitable, for example, as coating substances for substrates of all kinds, for example wood, textiles, paper, ceramic, glass, plastics such as polyesters, polyethylene terephthalate, polyolefins or cellulose acetate, especially in the form of films, and also metals such as Al, Cu, Ni, Fe, Zn, Mg or Co and GaAs, Si or $SiO_2$, on which it is desired to apply a protective coating or, by imagewise exposure, an image. The photocurable compositions of the instant invention are especially useful for clear and white pigmented coatings on wood, metal, plastic and glass. The photocurable layer may be applied by electrodeposition to metal.

The substrate surface can be coated by applying to said substrate a liquid composition, a solution or suspension. The choice of solvent and the concentration will depend mainly on the type of formulation and on the coating method employed. The solvent should be inert; in other words it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate. The suspension is uniformly applied to a substrate by known coating techniques such as by spin coating, dip coating, curtain coating, knife coating, brushing or spraying or reverse roll coating. It is also possible to apply the photosensitive layer to a temporary, flexible support and then to coat the final substrate, for example a copper-laminated circuit board, by means of layer transfer via lamination.

The add-on (layer thickness) and the nature of the substrate (layer support) are functions of the desired application. The layer thicknesses are generally in the range from about 0.1 $\mu$m to about 250 $\mu$m and there are no obvious restrictions on coating thickness according to this invention.

Photocuring is of considerable importance for printing inks, since the drying time of the binder is a crucial factor for the production rate of graphic products and should be in the order of fractions of seconds. UV-curable inks are important, in particular, for screen printing. The compositions of the instant invention are useful for printing inks of all types including screen print, flexographic, gravure and off-set printing inks.

A further area of application for photocuring is in the coating of metals, for example in the coating of metal sheets and tubes, cans or bottle caps, as well as metal constructions such as bridges and the like, which may be cured with daylight. The invention is also important for daylight curing of wood constructions such as lightweight constructions. Also of interest is the photocuring of plastic coatings, for example PVC based wall or floor coverings. Coatings of particular interest have resins selected from polycarbonate, polymethacrylate, epoxy resins and urethane acrylate, among others.

Examples of the photocuring of paper coatings are the colorless coating of labels, record sleeves or book covers.

The use of the photoinitiator systems according to the invention for curing shaped articles made from composite compositions is likewise of interest. The composite composition is made up of a self-supporting matrix material, for example a glass-fiber fabric, or else, for example, plant fibers (cf. K.-P. Mieck and T. Reussmann in Kunststoffe 85 (1995), 366–370), which is impregnated with the photocuring formulation. Shaped articles which are produced from composite compositions, using the photoinitiator systems according to the invention, are of high mechanical stability and resistance. The photoinitiator systems according to the invention can also be used as photocuring agents in molding, impregnating and coating compositions, as are described, for example, in EP-A-7086. Examples of such compositions are fine coating resins on which stringent requirements are placed with respect to their curing activity and resistance to yellowing, or fiber-reinforced moldings such as planar or longitudinally or transversely corrugated light diffusing panels. Processes for the production of such moldings, for example hand lay-up, spray lay-up, centrifugal or filament winding processes, are described by, for example, P. H. Selden in "Glasfaserverstarkte Kunststoffe" (Glass fiber-reinforced plastics), page 610, Springer Verlag Berlin-Heidelberg-New York 1967. Examples of articles which can be produced by this process are boats, chipboard or plywood panels coated on both sides with glass fiber-reinforced plastic, pipes, containers and the like. Other examples of molding, impregnating and coating compositions are UP resin fine coatings for moldings containing glass fibers (GRP), e.g. corrugated sheets and paper laminates. Paper laminates may also be based on urea or melamine resins. The fine coating is produced on a support (for example a sheet) prior to the production of the laminate. The photocurable compositions according to the invention can also be used for casting resins or for encapsulating articles such as electronic components and the like. Curing employs medium-pressure mercury lamps as are conventional in UV curing. However, less intense lamps are also of particular interest, for example those of the type TL 40W/03 or TL40W/05. The intensity of these lamps corresponds approximately to that of sunlight. It is also possible to employ direct sunlight for curing. A further advantage is that the composite composition can be removed in a part-cured, plastic state from the light source and can be shaped. Complete curing is carried out subsequently.

The instant compositions are useful in many other miscellaneous applications where a yellow color in the cured article cannot be tolerated, such as eyeglass lenses and lens coatings. Eyeglass lenses may typically be formed from polymethacrylate resins.

The use of the processes and compositions according to this invention will provide economic advantage to practitioners because the substrate will not have to be over-irradiated in order to photo-bleach the formed finished product, which process is detrimental to the final product and further wastes time and energy. Additionally, the processes and compositions of this invention will allow practitioners to use higher levels of acylphosphine oxide photoinitiators. This will provide economic advantage by allowing faster cure times and therefore faster production rates.

The invention also relates to a process for coating surfaces by applying a formulation as described supra to said surfaces and curing the layer by irradiation with ultraviolet light, daylight or a light source equivalent to daylight.

The photosensitivity of the compositions according to the invention generally ranges from the UV region (about 200 nm) up to about 600 nm. Suitable radiation comprises, for example, sunlight or light from artificial sources. Therefore, a large number of very different types of light source can be used. Both point sources and flat radiators (lamp carpets) are appropriate. Examples are carbon arc lamps, xenon arc lamps, medium-pressure, high-pressure and low-pressure mercury lamps, doped with metal halides if desired (metal halogen lamps), microwave-stimulated metal vapor lamps, excimer lamps, superactinic fluorescent tubes, fluorescent lamps, incandescent argon lamps, electronic flashlights, photographic flood lamps, electron beams and X-rays. Artificial light sources equivalent to daylight may be used, such as low intensity lamps such as specific fluorescent lamps, e.g. Philips TL05 or TL09 special fluorescent lamps. The distance between the lamp and the substrate according to the invention which is to be coated can vary depending on the application and on the type and/or power of the lamp, for example between 2 cm and 150 cm. Also suitable, for example, are lasers in the visible range. The cure may be effected behind a transparent layer (e.g. a pane of glass or plastic sheet).

Complicated and expensive apparatus is superfluous when using light sources that emit light of low intensity, and the compositions in this case can be used in particular for special exterior applications. The cure with daylight or with light sources equivalent to daylight is an alternative to the standard moving belt method of UV curing. In contrast to the moving belt method, which is particularly suitable for flat parts, the daylight cure can be used for exterior coatings on stationary and fixed objects or constructions. These are typically coatings on buildings, facades, bridges, ships or markings on roads and sites as disclosed, inter alia, in EP-A-160723.

The cure with daylight or with light sources equivalent to daylight is an energy-saving method and, in exterior applications, no emission of volatile organic components into the environment occurs. The cure with daylight or light sources equivalent to daylight is, however, also suitable for series curing in which the objects are so positioned that angular areas are also exposed to daylight. In this connection, mirrors or reflectors can also be used.

The invention therefore also provides a method for the photopolymerization of compounds having ethylenically unsaturated double bonds, which comprises irradiating a composition according to the invention as described above, with light in the range from about 200 nm to about 600 nm.

The invention also provides for the use of the above-described composition for the production of surface coating materials, printing inks, printing plates, dental compositions and resist materials and as image recording material, especially for holographic recordings.

The invention likewise provides a coated substrate which is coated on at least one surface with a composition as described above, and to a process for the photographic production of relief images, in which a coated substrate is subjected to imagewise exposure and then the unexposed portions are removed with a solvent. This exposure can take place either through a mask or by means of a laser beam without a mask.

The invention is described in more detail by the following Examples in which, and throughout the remainder of the description and in the claims, parts and percentages are by weight, unless otherwise indicated.

EXAMPLE 1

Initial Yellowing After Curing with Irgacure® 819 in a White Screen Ink

A model white UV-curable screen ink, based on urethane acrylate chemistry, is prepared with a fixed pigment to binder ratio of 0.74. A masterbatch is prepared which is a complete formulation excluding photoinitiator of component (a), pigment of component (b) and additional photoinitiators.

The masterbatch consists of the following:

Rutile $TiO_2$, 500.0 g

Ebecryl® 284, 300.0 g

Ebecryl® 810, 100.0 g

Trimethylolpropane ethoxy triacrylate (TMPEOTA), 60.0 g

Tripropylene glycol diacrylate (TRPGDA), 180.0 g

Isobornyl acrylate (IBOA), 30.0 g

Modaflow® 2100, 5.0 g

Byk®-A 501, 5.0 g

Aerosil® 200, 20.0 g

The $TiO_2$ is added as a 66% dispersion in a portion of the Ebecryl® 284. The Aerosil® 200 is added as a 10% dispersion in the TRPGDA.

Ebecryl® 284 is an acrylated aliphatic urethane oligomer/monomer blend. Ebecryl® 810 is a polyester acrylate oligomer. The Ebecryl® products as well as the acrylate monomers are available from UCB Chemicals Corp., Smyrna, Ga. Modaflow® 2100 is an acrylic flow agent available from Monsanto. Byk®-A 501 is an air release agent available from Byk-Chemie. Aerosil® 200 is a fumed silica viscosity modifier from Degussa.

To a portion of the masterbatch is added a photoinitiator mixture of Irgacure® 819/Irgacure® 184 in a 35/65 ratio. The photoinitiator mixture is 4.78 weight percent of the formulation. Irgacure® 819 is a bisacylphosphine oxide, bis(2,4,6-trimethylbenzoyl)phenylphosphine oxide, and Irgacure® 184 is 1-hydroxycyclohexylphenylketone; both available from Ciba Specialty Chemicals Corp.

Dispersions of the pigments of component (b) in Ebecryl® 284 (10% by weight) are prepared via a 3-roll mill. The dispersions are further diluted to 5% by weight pigment by the addition of TRPGDA monomer.

A portion of the 5% by weight Cromophtal® Violet GT dispersion is added to a portion of the above ink formulation containing the photoinitiator mixture to prepare a Cromophtal® Violet GT stock solution of 0.0354% by weight pigment.

A portion of the 5% by weight Monastral® Violet Red NRT-201-D dispersion is added to a portion of the above ink formulation containing the photoinitiator mixture to prepare a Cromophtal® Violet GT stock solution of 0.144% by weight pigment.

Monastral® Violet Red NRT-201-D is an organic pigment of the quinacridone class and Cromophtal® Violet GT is of the carbazole dioxazine class. Monastral® and Cromophtal® are registered trademarks of Ciba Specialty Chemicals Corp.

Portions of the pigment stock solutions are added to portions of the ink formulation containing the photoinitiator mixture to prepare the formulations listed in Tables 1 and 2. Weight percents in Tables 1 and 2 are of the overall formulations tested.

TABLE 1

| Formulation | Irgacure ® 819/Irgacure ®184 in a 35/65 ratio (weight percent) | Cromophtal ® Violet GT (weight percent) |
| --- | --- | --- |
| 1 | 4.78 | — |
| 2 | 4.74 | 0.0042 |
| 3 | 4.75 | 0.0006 |
| 4 | 4.76 | 0.0012 |
| 5 | 4.74 | 0.0018 |

TABLE 2

| Formulation | Irgacure ® 819/Irgacure ® 184 in a 35/65 ratio (weight percent) | Monastral ® Violet Red NRT-201-D (weight percent) |
| --- | --- | --- |
| 6 | 4.76 | 0.0011 |
| 7 | 4.74 | 0.0022 |
| 8 | 4.74 | 0.0030 |
| 9 | 4.74 | 0.0047 |

Eight replicate prints of each formulation are prepared. Application is made via a 355 mesh screen and applied on polycarbonate sheets. Samples are cured with a moving belt at 50 feet/min under two medium pressure mercury lamps perpendicular to the belts @ 200 watts/in. each. All prints receive two passes under the lamps. Final layer thickness is approximately 1.2 to 1.3 mils (31–34 microns). Immediately following cure, each of the eight prints are measured for color in four places with a Macbeth® Color-Eye® Spectrophotometer. Three parameters are measured, L, a and b. L is a measure of light and dark on a scale of 0 (dark) to 100 (light). Positive a values represent red and negative a values represent green. Positive b values represent yellow and negative b values represent blue. The human eye can see differences in a or b values of about 0.5 units. Zero readings for a and b represent no color. The results are in Table 3.

TABLE 3

| Formulation | L | a | b |
| --- | --- | --- | --- |
| 1 | 96.58 | −1.34 | 1.64 |
| 2 | 94.01 | 1.48 | −2.05 |
| 3 | 96.16 | −0.85 | 0.92 |
| 4 | 95.98 | −0.52 | 0.54 |
| 5 | 95.58 | −0.05 | −0.10 |
| 6 | 96.37 | −1.17 | 1.27 |
| 7 | 96.10 | −0.90 | 0.91 |
| 8 | 96.08 | −0.71 | 0.69 |
| 9 | 95.38 | −0.13 | −0.04 |

Control Formulation 1, containing a bisacylphosphine oxide photoinitiator, is yellow to the eye after curing (high positive b value). The compositions of the instant invention, containing in addition to bisacylphosphine oxide photoinitiator, a light-fast red, blue or violet organic pigment at low levels, have significantly reduced yellowness. Formulations 5 and 9 have virtually no color after curing.

EXAMPLE 2

Initial Yellowing After Curing with Irgacure® 819 in a White Pigmented Coating

A model white UV-curable coating for wood is prepared based on polyester acrylate chemistry with a titanium dioxide level of 25% by weight. A masterbatch is prepared which is a complete formulation excluding photoinitiator of component (a), pigment of component (b) and additional photoinitiators.

The masterbatch consists of the following:

Rutile $TiO_2$, 100.0 g
Ebercryl® 830, 240.0 g
HDODA, 42 g
TMPTA, 18.0 g

The $TiO_2$ is added as a 63% dispersion in a portion of the Ebercryl® 830. Ebercryl® 830 is a hexafunctional polyester acrylate oligomer. HDODA is 1,6-hexanediol diacrylate. TMPTA is trimethylolpropane triacrylate. The Ebecryl® products as well as the acrylate monomers are available from UCB Chemicals Corp., Smyrna, Ga.

To a portion of the masterbatch is added a photoinitiator mixture of Irgacure® 819/Irgacure® 184 in a 1:2 ratio. The photoinitiator mixture is 3.0 weight percent of the total formulation.

A portion of a 10% by weight carbazole violet pigment dispersion in TMPTA monomer is added to a portion of the white paint formulation containing the photoinitiator to prepare a pigment stock solution of 0.010% by weight pigment. The 10% pigment dispersion is product #9S93 available from Penn Color, Doylestown, Pa.

Portions of the pigment stock solution are added to portions of the paint formulation containing photoinitiator to prepare the formulations listed in Table 4. The pigment dispersion is mixed into the formulations using a high speed disperser at 2000 rpm for 5 minutes. Weight percents in Table 4 are of the overall formulations tested.

Eight replicate prints of each formulation are prepared. Films are prepared with a drawar over a white Scotchcal® vinyl film from 3M. Samples are cured with a moving belt at 58 /min. under two medium pressure mercury lamps perpendicular to the belts @ 300 watts/in. each. The prints received one pass under the lamps. Irradiance received is 618 mJ/cm$^2$. Final red thickness is 2.1 mils (53 microns). Immediately following cure, each print is measured for color in four places with a Macbeth® Color-Eye® Spectrophotometer. Three parameters are measured as in Example 1. Results are in Table 4.

TABLE 4

| Formulation | Irgacure ® 819/ Irgacure ®184 in a 1:2 ratio (weight percent) | carbazole violet pigment (weight percent) | L | a | b |
| --- | --- | --- | --- | --- | --- |
| 1 | 3.0 | — | 97.82 | −1.35 | 2.73 |
| 2 | 3.0 | 0.001 | 96.82 | −0.13 | 1.29 |
| 3 | 3.0 | 0.0006 | 97.07 | −0.53 | 1.76 |

Control formulation 1, containing a bisacylphosphine oxide photoinitiator, is yellow to the eye after curing (high positive b value). The compositions of the instant invention, 38 containing in addition to a bisacylphosphine oxide photoinitiator, a light-fast organic violet pigment at low levels, have significantly reduced yellowness.

EXAMPLE 3

Initial Yellowing After Curing with Irgacure® 819 in a Clear Coating

A model clear UV-curable coating for wood is prepared based on acrylated aromatic urethane/epoxy chemistry. A masterbatch is prepared which is a complete formulation excluding photoinitiator of component (a), pigment of component (b) and additional photoinitiators.

The masterbatch consists of the following:
Ebercryl® 4827, 30.0 g
Ebercryl® 600, 30.0 g
Tripropylene glycol diacrylate (TRPGDA), 40.0 g
Ebercryl® 4827 is an aromatic urethane diacrylate oligomer. Ebercryl® 600 is the diacrylate ester of a bisphenol-A epoxy resin. The Ebecryl® products as well as the acrylate monomers are available from UCB Chemicals Corp., Smyrna, Ga.

To a portion of the masterbatch is added a photoinitiator mixture of Irgacure® 819/Irgacure® 184 in a 1:2 ratio. The photoinitiator mixture is 3.0 weight percent of the formulation.

A portion of a 10% by weight carbazole violet pigment dispersion in TMPTA monomer is added to a portion of the clear coat formulation containing the photoinitiator to prepare a pigment stock solution of 0.010% by weight pigment. The 10% pigment dispersion is product #9S93 available from Penn Color, Doylestown, Pa.

Portions of the pigment stock solution are added to portions of the clear coat formulation containing photoinitiator to prepare the formulations listed in Table 5. The pigment dispersion is into the formulations using a high speed disperser at 2000 rpm for 5 minutes. Weight percents in Table 5 are of the overall formulations tested.

Four replicate prints of each formulation are prepared. Films are prepared with a draw-down bar over a white Scotchcal® vinyl film from 3M. Samples are cured with a moving belt at 95 feet/min. under two medium pressure mercury lamps perpendicular to the belts @ 300 watts/in. each. The prints received two passes under the lamps. Irradiance received is 750 mJ/cm$^2$. Final cured thickness is 5.1 mils (130 microns). Immediately following cure, each print is measured for color in four places with a Macbeth® Color-Eye® Spectrophotometer. Three parameters are measured as in Example 1. Results are in Table 5.

TABLE 5

| Formulation | Irgacure ® 819/ Irgacure ®184 in a 1:2 ratio (weight percent) | carbazole violet pigment (weight percent) | L | a | b |
| --- | --- | --- | --- | --- | --- |
| 1 | 3.0 | — | 96.67 | −2.39 | 6.56 |
| 2 | 3.0 | 0.001 | 93.53 | 0.71 | 2.96 |
| 3 | 3.0 | 0.0005 | 94.95 | −0.86 | 4.54 |
| 4 | 3.0 | 0.00025 | 96.11 | −1.42 | 5.09 |

Control formulation 1, containing a bisacylphosphine oxide photoinitiator, is yellow to the eye after curing (high positive b value). The compositions of the instant invention, containing in addition to a bisacylphosphine oxide photoinitiator, a light-fast organic violet pigment at low levels, have significantly reduced yellowness.

EXAMPLE 4

Initial Yellowing After Curing with Irgacure® 819

When Examples 1–3 are repeated replacing the Irgacure® 819/Irgacure® 184 photoinitiator mixtures with Irgacure® 819 alone, the white screen ink, white coating and clear coating formulations according to this invention show decreased initial yellowing after curing compared to the control formulations.

EXAMPLE 5

Initial Yellowing After Curing with a Monoacylphosphine Oxide Photoinitiator

When Examples 1–3 are repeated replacing the Irgacure® 819/Irgacure® 184 photoinitiator mixtures with diphenyl(2,4,6-trimethylbenzoyl)phosphine oxide alone, the white screen ink, white coating and clear coating formulations according to this invention show decreased initial yellowing after curing compared to the control formulations.

EXAMPLE 6

Initial Yellowing After Curing with Irgacure® 819

When Examples 1–3 are repeated using a pigment selected from the class of perylene red pigments, the white screen ink, white coating and clear coating formulations according to this invention show decreased initial yellowing after curing compared to the control formulations.

EXAMPLE 7

Initial Yellowing After Curing with Irgacure® 819 in a White Powder Coating

A typical white, radiation-curable powder coating resin composition consists of the following components in parts by weight: 5–6 parts of an unsaturated polyester amorphous oligomer, 1 part divinyl ether crystalline monomer, 2–3.5 parts rutile titanium dioxide, 0.015 parts flow-aid, 0.02 parts Irgacure® 819 and 0.004 parts Irgacure® 2959. The ingredients are blended together in an extruder and ground into a fine powder. The powder is applied to the substrate to be coated and is subsequently melted with an infrared heat source which allows for continuous film formation. In the melt state the resin is exposed to the radiation source to initiate curing.

Irgacure® 819 is a bisacylphosphine oxide, bis(2,4,6-trimethylbenzoyl)phenylphosphine oxide, and Irgacure® 2959 is 1-(4-(2-hydroxyethoxy)-phenyl)-2-hydroxy-2-methyl-propan-1-one; both available from Ciba Specialty Chemicals Corp.

When a carbazole violet pigment is additionally formulated into the typical powder coating formulation according to the present invention, a decreased initial yellowing after curing is observed compared to the typical formulation.

EXAMPLE 8

Initial Yellowing After Curing with Irgacure® 819 in a White Gel Coat

A typical gel coat formulation consists of an unsaturated polyester oligomer with a styrene diluent added to control viscosity. Styrene is normally present at about 35% by weight. The other components are typically rutile $TiO_2$, about 10% by weight and Irgacure@ 819, about 2% by weight. The mixture is either sprayed, brushed or drawn down on the substrate and cured to a glassy solid state. The cure line speeds are about 60 feet per minute per lamp with Fusion D lamps and about 24 feet per minute per lamp with standard mercury lamps. The film thickness is about 20 mils.

Irgacure® 819 is a bisacylphosphine oxide, bis(2,4,6-trimethylbenzoyl)phenylphosphine oxide, available from Ciba Specialty Chemicals Corp.

When a carbazole violet pigment is additionally formulated into the typical gel coat formulation according to the present invention, a decreased initial yellowing after curing is observed compared to the typical formulation.

What is claimed is:

1. A process for curing ethylenically unsaturated polymerizable compounds, wherein minimal yellowing occurs upon curing, which comprises
adding to said compounds
   (a) at least one acylphosphine oxide photoinitiator of formula (I)

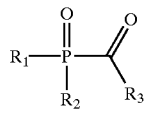
(I)

in which $R_1$ and $R_2$ independently of one another are $C_1$–$C_{12}$ alkyl, benzyl, phenyl which is unsubstituted or substituted from one to four times by halogen, $C_1$–$C_8$ alkyl and/or $C_1$–$C_8$ alkoxy, or are cyclohexyl or a group $COR_3$; or
$R_1$ is —$OR_4$, or a group

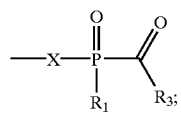

$R_3$ is phenyl which is unsubstituted or substituted from one to four times by $C_1$–$C_8$ alkyl, $C_1$–$C_8$ alkoxy, $C_1$–$C_8$ alkylthio and/or halogen, or is a group

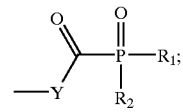

$R_4$ is $C_1$–$C_8$ alkyl, phenyl or benzyl;
Y is phenylene, $C_1$–$C_{12}$ alkylene or cyclohexylene; and
X is $C_1$–$C_{18}$ alkylene or a group

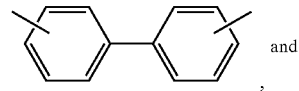
and (b) one or more lightfast red, blue or violet organic pigments
wherein the weight ratio of component (b) to component (a) is from about 10 parts per million to about 10,000 parts per million, and
wherein a dispersion of the pigment or pigments of component (b) in a liquid has a positive a value and a negative b value on the L, a, b tri-stimulus color scale,
and irradiating the mixture so obtained with ultraviolet radiation or daylight or with light sources equivalent to daylight.

2. A process according to claim 1, in which component (a) is at least one acylphosphine oxide of formula (Ia)

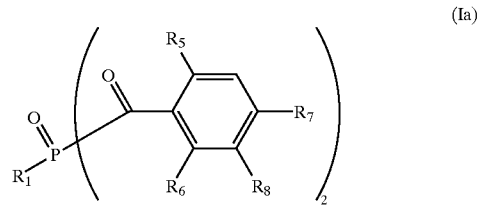
(Ia)

wherein
$R_1$ is $C_1$–$C_{12}$ alkyl, cyclohexyl or phenyl which is unsubstituted or substituted from one to four times by halogen and/or $C_1$–$C_8$ alkyl,
$R_5$ and $R_6$ are each independently of the other $C_1$–$C_8$ alkyl,
$R_7$ is hydrogen or $C_1$–$C_8$ alkyl, and
$R_8$ is hydrogen or methyl.

3. A process according to claim 2, in which $R_1$ in the compound of formula (Ia) is $C_2$–$C_{10}$ alkyl, cyclohexyl or phenyl.

4. A process according to claim 2, in which $R_5$ and $R_6$ in the compound of formula (Ia) are $C_1$–$C_4$ alkyl and $R_7$ is hydrogen or $C_1$–$C_4$ alkyl.

5. A process according to claim 2, in which the compound of formula (Ia) is bis(2,4,6-trimethylbenzoyl) phenylphosphine oxide.

6. A process according to claim 1, in which component (b) is one or more organic pigments selected from the group consisting of quinacridone, carbazole dioxazine and perylene red pigments.

7. A process according to claim 6, in which a 5 parts per million by weight dispersion of the pigment or pigments of component (b) in a liquid has an a value of about 15 to about 25 and a b value of about −15 to about −30 on the L, a, b tri-stimulus color scale.

8. A process according to claim 1, which comprises
adding to said ethylenically unsaturated polymerizable compounds,
other photoinitiators in addition to the photoinitiator or photoinitiators of formula (I).

9. A process according to claim 8, which comprises
adding to said ethylenically unsaturated polymerizable compounds,
other photoinitiators selected from the group consisting of α-hydroxycycloalkylphenylketones in addition to the photoinitiator or photoinitiators of formula (I).

10. A process according to claim 1, in which the ethylenically unsaturated polymerizable compounds are a mixture of (i) at least one oligomeric compound and (ii) at least one monomer.

11. A process according to claim 10, in which the ethylenically unsaturated polymerizable compounds are a mixture of (i) unsaturated polyesters and (ii) acrylates, methacrylates or styrene, or mixtures thereof.

12. A process according to claim 10, in which the ethylenically unsaturated polymerizable compounds are a mixture of (i) polyester acrylates and (ii) acrylates or methacrylates or mixtures thereof.

13. A process according to claim 1, in which the ethylenically unsaturated polymerizable compounds are dissolved or emulsified in water.

14. A process according to claim 1, in which the weight ratio of component (b) to component (a) is from about 100 parts per million to about 1000 parts per million.

15. A process according to claim 1, in which the photoinitiator or photoinitiators of component (a) are used in an amount of about 0.05 to about 15% by weight of the overall formulation.

16. A process according to claim 1, in which the photoinitiator or photoinitiators of component (a) are used in an amount of about 0.2 to about 5% by weight of the overall formulation.

17. A process according to claim 1, which comprises
adding to said ethylenically unsaturated polymerizable compounds, in addition to components (a) and (b),
one or more light stabilizers selected from the group consisting of hydroxyphenylbenzotriazoles, hydroxyphenyl-s-triazines and hindered amines based on 2,2,6,6-tetramethylpiperidine.

18. A process according to claim 1 in which the mixture is irradiated with light in the range of about 200 nm to about 600 nm.

19. A process according to claim 1 for producing cured coatings on a substrate.

20. A process according to claim 1 for producing clear or white coatings on wood, metal, plastic or glass.

21. A process according to claim 1 for producing printing inks selected from the group consisting of screen print, flexographic, gravure and off-set printing inks.

22. A process according to claim 1 for producing white gel coatings or white powder coatings.

23. A process according to claim 1 for producing clear coatings for optical fibers.

24. A process according to claim 1 for producing eyeglass lenses or lens coatings.

25. A process for coating substrates which comprises
applying a composition which undergoes minimal yellowing upon curing and
curing the composition by irradiation with ultraviolet radiation or daylight or with light sources equivalent to daylight,
said composition comprising
at least one ethylenically unsaturated polymerizable compound,
(a) is at least one acylphosphine oxide of formula (Ia)

$$\left( \begin{array}{c} \text{structure} \end{array} \right)_2 \quad \text{(Ia)}$$

wherein
$R_1$ is $C_1$–$C_{12}$ alkyl, cyclohexyl or phenyl which is unsubstituted or substituted from one to four times by halogen and/or $C_1$–$C_8$ alkyl,
$R_5$ and $R_6$ are each independently of the other $C_1$–$C_8$ alkyl,
$R_7$ is hydrogen or $C_1$–$C_8$ alkyl, and
$R_8$ is hydrogen or methyl and
(b) one or more lightfast red, blue or violet organic pigments
wherein the weight ratio of component (b) to component (a) is from about 10 parts per million to about 10,000 parts per million, and
wherein a dispersion of the pigment or pigments of component (b) in a liquid has a positive a value and a negative b value on the L, a, b tri-stimulus color scale.

26. A photoinitiator system comprising
(a) at least one acylphosphine oxide photoinitiator of formula (I) according to claim 1 and
(b) one or more lightfast red, blue or violet organic pigments
wherein the weight ratio of component (b) to component (a) is from about 10 parts per million to about 10,000 parts per million, and
wherein a dispersion of the pigment or pigments of component (b) in a liquid has a positive a value and a negative b value on the L, a, b tri-stimulus color scale.

27. A photoinitiator system comprising
(a) at least one acylphosphine oxide photoinitiator of formula (Ia) according to claim 2 and
(b) one or more lightfast red, blue or violet organic pigments
wherein the weight ratio of component (b) to component (a) is from about 10 parts per million to about 10,000 parts per million, and
a dispersion of the pigment or pigments of component (b) in a liquid has a positive a value and a negative b value on the L, a, b tri-stimulus color scale.

* * * * *